US010005042B2

(12) United States Patent
Dubois et al.

(10) Patent No.: US 10,005,042 B2
(45) Date of Patent: *Jun. 26, 2018

(54) THIN FILM COMPOSITE FORWARD OSMOSIS MEMBRANES WITH PERFORMANCE ENHANCING LAYERS

(71) Applicants: International Business Machines Corporation, Armonk, NY (US); San Jose State University Research Foundation, San Jose, CA (US)

(72) Inventors: Geraud J. Dubois, Los Altos, CA (US); Robert D. Miller, San Jose, CA (US); Young-Hye Na, San Jose, CA (US); Victoria Piunova, San Jose, CA (US); Joseph Sly, San Jose, CA (US); Daniel Stillman, San Jose, CA (US)

(73) Assignees: International Business Machines Corporation, Armonk, NY (US); San Jose State University Research Foundation, San Jose, CA (US)

( * ) Notice: Subject to any disclaimer, the term of this patent is extended or adjusted under 35 U.S.C. 154(b) by 467 days.

This patent is subject to a terminal disclaimer.

(21) Appl. No.: 14/623,313

(22) Filed: Feb. 16, 2015

(65) Prior Publication Data
US 2016/0236153 A1  Aug. 18, 2016

(51) Int. Cl.
*B01D 71/28* (2006.01)
*B01D 69/00* (2006.01)
(Continued)

(52) U.S. Cl.
CPC ......... *B01D 69/10* (2013.01); *B01D 67/0088* (2013.01); *B01D 69/12* (2013.01);
(Continued)

(58) Field of Classification Search
CPC .......... C08F 20/06; C08F 20/20; C08F 20/56; C08F 12/08; C08F 12/36; C08F 212/08;
(Continued)

(56) References Cited

U.S. PATENT DOCUMENTS 4,087,388 A   5/1978  Jensen et al.
4,277,344 A   7/1981  Cadotte
(Continued)

FOREIGN PATENT DOCUMENTS

CN        1394901 A     2/2003
CN      101053779 A    10/2007
(Continued)

OTHER PUBLICATIONS

"List of IBM Patents or Patent Applications Treated as Related," Appendix P, 2 pp.
(Continued)

*Primary Examiner* — Pamela H Weiss
(74) *Attorney, Agent, or Firm* — Shumaker & Sieffert, P.A.

(57) ABSTRACT

A thin film composite (TFC) forward osmosis (FO) membrane includes a porous support with surfaces having thereon a hydrophilic self-assembled monolayer. An active layer on the support is sufficiently dense to remove an ionic species from a liquid.

15 Claims, 7 Drawing Sheets

(51) Int. Cl.
  *C08J 5/12* (2006.01)
  *B01D 69/10* (2006.01)
  *B01D 67/00* (2006.01)
  *B01D 69/12* (2006.01)
  *B01D 71/56* (2006.01)
  *B01D 71/82* (2006.01)
  *B01D 61/00* (2006.01)
  *B01D 71/80* (2006.01)

(52) U.S. Cl.
  CPC ........... *B01D 69/125* (2013.01); *B01D 71/56* (2013.01); *B01D 71/82* (2013.01); *B01D 61/002* (2013.01); *B01D 71/80* (2013.01); *B01D 2323/00* (2013.01); *B01D 2323/30* (2013.01); *B01D 2325/36* (2013.01)

(58) Field of Classification Search
  CPC .... C08F 212/36; C08F 220/06; C08F 220/22; C08F 220/56; B01D 69/10; B01D 71/56; B01D 71/82; B01D 69/12; B01D 69/125; B01D 67/0088; B01D 71/80; B01D 61/002; B01D 2323/00; B01D 2323/30; B01D 2325/36
  See application file for complete search history.

(56) References Cited

U.S. PATENT DOCUMENTS

| | | | |
|---|---|---|---|
| 4,704,324 | A | 11/1987 | Davis et al. |
| 4,824,568 | A | 4/1989 | Allegrazza, Jr. et al. |
| 5,482,634 | A | 1/1996 | Goerlach-Doht et al. |
| 7,365,142 | B2 | 4/2008 | Schlenoff et al. |
| 7,825,199 | B1 | 1/2010 | Matyjaszewski et al. |
| 7,713,544 | B2 | 5/2010 | Chaikof et al. |
| 7,918,349 | B2 | 4/2011 | Mickols et al. |
| 8,011,517 | B2 | 9/2011 | Allen et al. |
| 8,061,533 | B2 | 11/2011 | Mays et al. |
| 8,110,679 | B2 | 2/2012 | Kriesel et al. |
| 8,505,743 | B2 | 8/2013 | Sarkar et al. |
| 8,727,135 | B2 | 5/2014 | Cheng et al. |
| 8,765,098 | B2* | 7/2014 | Appel .............. A61K 47/48176 424/400 |
| 2004/0050791 | A1 | 3/2004 | Herczeg |
| 2007/0037933 | A1 | 2/2007 | Kurth et al. |
| 2007/0251883 | A1 | 11/2007 | Niu |
| 2008/0135482 | A1 | 6/2008 | Singh et al. |
| 2009/0053139 | A1 | 2/2009 | Shi et al. |
| 2009/0114596 | A1 | 5/2009 | Kriesel et al. |
| 2009/0203980 | A1 | 8/2009 | Carlson et al. |
| 2011/0076504 | A1 | 3/2011 | Van De Weerdt et al. |
| 2011/0207841 | A1 | 8/2011 | Kosar et al. |
| 2011/0243848 | A1* | 10/2011 | Appel .............. A61K 47/48176 424/9.1 |
| 2011/0305872 | A1 | 11/2011 | Li et al. |
| 2012/0048799 | A1* | 3/2012 | Na .................. B01D 69/125 210/490 |
| 2012/0237447 | A1* | 9/2012 | Lee .................. A61K 49/0036 424/9.1 |
| 2012/0241373 | A1 | 9/2012 | Na et al. |
| 2013/0001153 | A1 | 1/2013 | Na et al. |
| 2013/0146521 | A1 | 6/2013 | Brozell et al. |

FOREIGN PATENT DOCUMENTS

| | | |
|---|---|---|
| CN | 102688701 A | 9/2012 |
| CN | 102711967 A | 10/2012 |
| KR | 101123859 B1 | 2/2012 |

OTHER PUBLICATIONS

U.S. Appl. No. 14/623,352, filed Feb. 16, 2015 by Dubois et al.
International Search Report and Written Opinion of International Application No. PCT/IB2016/050665, dated Jun. 6, 2016, 11 pp.
Decher, et al., "Buildup of ultrathin multilayer films by a self-assembly process: III. Consecutively alternating adsorption of anionic and cationic polyelectrolytes on charged surfaces," Thin Solid Films, 201/211, 1992, Elsevier Sequoia, pp. 831-835.
Su, et al., "Preparation and performance of dynamic layer-by-layer PDADMAC/PSS nanofiltration membrande," Journal of Membrane Science 423-424, 2012, pp. 324-331.
Zhao, et al., "Porous membranes modified by hyperbranched ploymers II. Effect of the arm length of amphiphilic hyperbranched-star polymers on the hydrophilicity and protein resistance of poly (vinylidence fluoride) membrandes," Science Direct, Journal of Membrane Science 304, 2007, pp. 138-147.
Jin, et al., "Use of Polyelectrolyte Layer-by-Layer Assemblies as Nonofiltration and Reverse Osmois Membranes," Langmuir, Feb. 10, 2003, 19, pp. 2550-2553.
Zhao, et al., "Improving Hydrophilicity and Protein Resistance of Poly (vinylidence fluoride) Membranes by Blending with Amphiphilic Hyberbranched-Star Polymer," Lanmuir 2007, 23, pp. 5779-5786.
Cima, et al., "Network Structures of Radiation-Cross-linked Star Polymer Gels," Macromolecules, 1995, 28, pp. 6787-6794.
Pereira Nunes, et al., "Membrane Technology in the Chemical Industry," Second Revised and Extended Edition, Wiley-VCH GmbH & Co. KGaA, 2006, 358 pp.
Petersen, Composite Reverse Osmosis and Nonfiltration Membranes, Journal of Membrane Science, 83, 1993, pp. 81-150.
Zhang, et al. "Well-constructed cellulose acetate membranes for forward osmosis: Minimized internal concentration polarization with an ultra-thin selective layer," Journal of Membrane Science 360, 2010, pp. 522-535.
Wang, et al. "Enhanced forward osmosis from chemically modified polybenzimidazole (PBI) nanofiltration hollow fiber membranes with a thin wall," Chemical Engineering Science 64, 2009, pp. 1577-1584.
Cath, et al., "Forward osmosis: Principles, applications, and recent developments," Journal of Membrane Science 281, 2006, pp. 70-87.
Wei, et al., "Synthesis and characterization of flat-sheet thin film composite forward osmosis membranes," Journal of Membrane Science 372, 2011, pp. 292-302.
Zhao, et al., "Recent developments in forward osmosis: Opportunities and challenges," Journal of Membrane Science 396, 2012, 21 pp.
U.S. Appl. No. 14/330,801, filed Jul. 14, 2014, by Dubois, et al.
Kim, et al. "Bio- and oil-fouling resistance of ultrafiltration membranes controlled by star-shaped block and random copolymer coatings,", RSC Advances, 2013, 3, 18071-18081 pp.
Kim, et al. "The increase of antifouling properties of ultrafiltration membrane coated by star-shaped polymers," RSC Advances, 22, 2012, pp. 8654-8661.
U.S. Appl. No. 15/695,778, filed Sep. 5, 2017 by Gerald J. Dubois et al.
Lu et al., "Nanofiltration Membranes Based on Rigid Star Amphiphiles," Chem. Mater., vol. 19, May 31, 2007, pp. 3194-3204.
Plamper et al., "Synthesis and Characterization of Star-Shaped Poly (N,N-dimethylaminoethyl methacrylate) and Its Quarternized Ammonium Salts," Macromolecules, vol. 40, Jul. 6, 2007, pp. 5689-5697.
Office Action from U.S. Appl. No. 14/623,352, dated Jun. 9, 2017, 34 pp.
Notice of Allowance from U.S. Appl. No. 14/623,352 dated Nov. 17, 2017, 24 pgs.
Response to Office Action dated Jun. 9, 2017, from U.S. Appl. No. 14/623,352, filed Oct. 10, 2017, 13 pp.

* cited by examiner

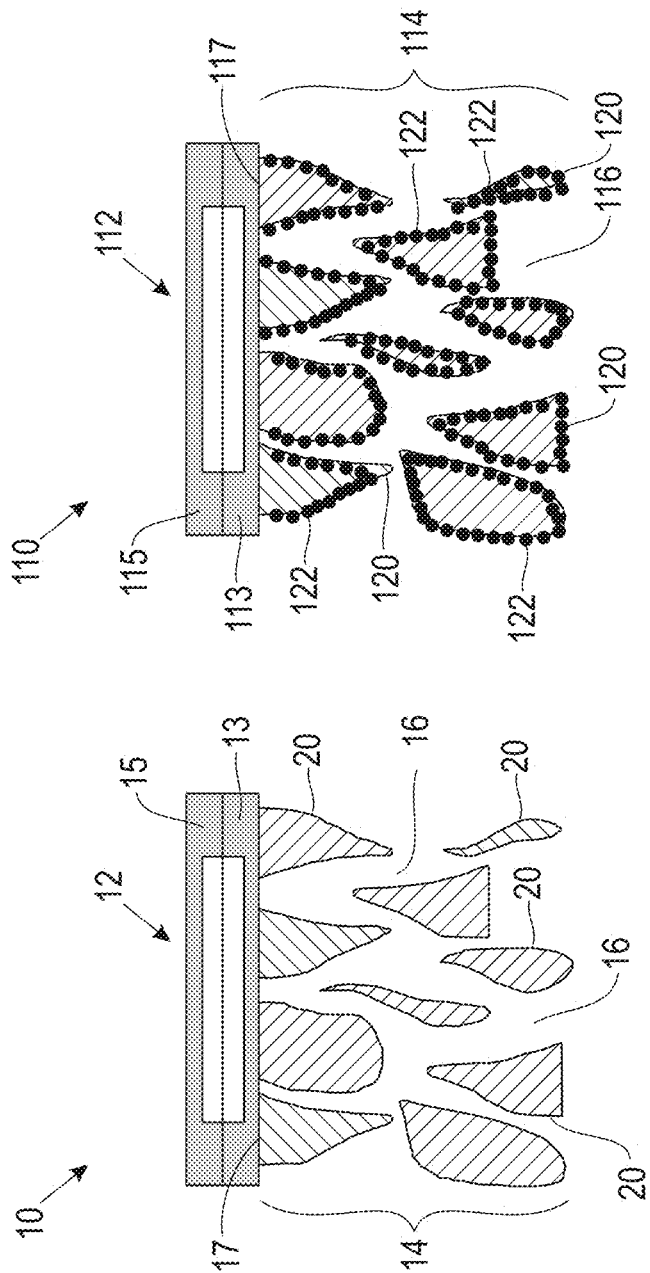

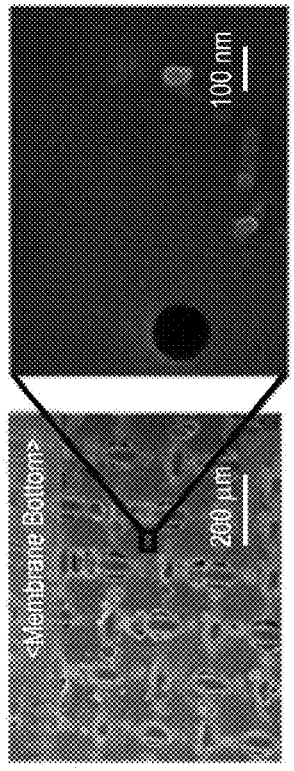
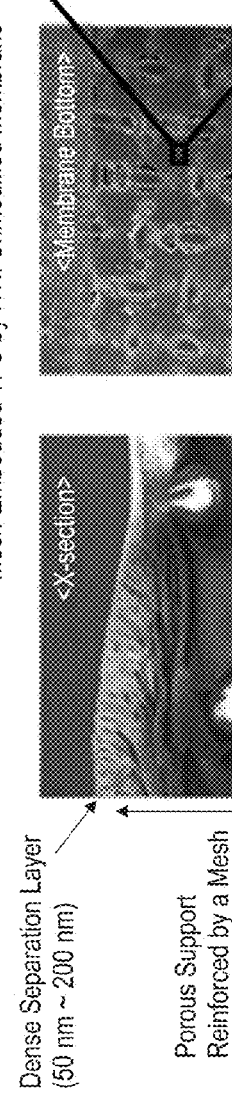
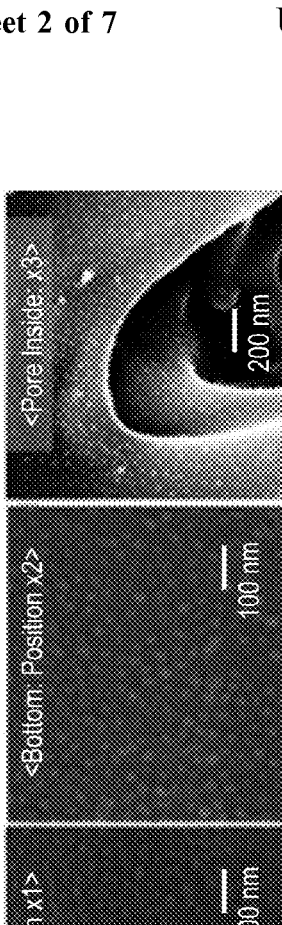
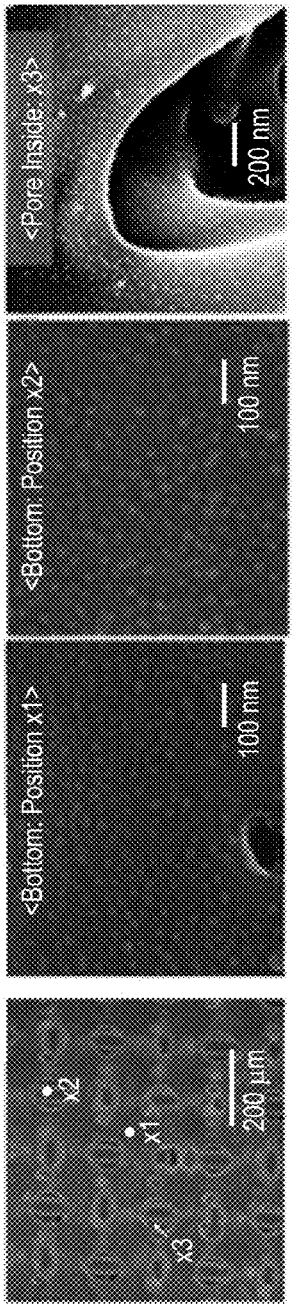
FIG. 2A FIG. 2B FIG. 2C
<Mesh-Embedded TFC by HTI: Unmodified Membrane>
FIG. 2D FIG. 2E FIG. 2F FIG. 2G
<Mesh-Embedded TFC by HTI: Star Polymer-Modified Membrane>

THIN FILM COMPOSITE FORWARD OSMOSIS MEMBRANES WITH PERFORMANCE ENHANCING LAYERS

BACKGROUND

Osmotically driven membrane processes (ODMPs) such as forward osmosis (FO) and pressure-retarded osmosis (PRO) have numerous applications including seawater desalination, wastewater treatment, emergency relief, and power generation. In forward osmosis (FO), an osmotic pressure gradient drives water across a semi-permeable membrane from a feed solution to a highly concentrated draw solution. Compared to pressure-driven membrane processes such as reverse osmosis (RO), FO operates at near zero hydraulic pressure, which can reduce membrane fouling and result in lower operating costs.

In some embodiments, thin film composite (TFC) polyamide RO membranes can include a polyamide active layer formed by interfacial polymerization on at least one support membrane such as, for example, polysulfone (PSF). The TFC membrane may also include an additional support membrane to enhance the mechanical stability of the PSF membrane underlying the active layer. When TFC membranes are used in FO applications, internal concentration polarization (ICP) is often generated within the thick, hydrophobic support layers of the membrane since mass transfer of water or salts across the membrane is substantially restricted by the support layer as well. ICP can significantly reduce the osmotic driving force across a membrane, which results in a substantial decrease in water flux. To reduce ICP in TFC membranes intended for FO applications, the backing layers of the TFC membranes can be modified to reduce overall membrane thickness. However, the hydrophobic nature of TFC support membranes such as PSF can still retard the mixing of water and salts, which can exacerbate ICP.

To be useful in FO applications, the wetting behavior of the porous support layers in the TFC membranes can also be enhanced by using hydrophilic polymers such as polybenzimidazole (PBI) and cellulose acetate (CA), but these hydrophilic support layers can swell when exposed to water, which can reduce mechanical stability of the support layers. Hydrophilic support materials can also interfere with interfacial polymerization processes used to form the polyamide active layer.

SUMMARY

In general, the present disclosure is directed to TFC FO membranes having a support layer modified with hydrophilic-functionalized star polymers. In various embodiments, the star polymers can include external hydrophilic functional groups selected to form a hydrophilic region or layer on a surface of at least a portion of pores of the polymer matrix of the support layer of the TFC membrane. In various embodiments, the hydrophilic functional groups on the star polymers can include positively charged moieties, neutral hydrophilic moieties, negatively charged moieties, zwitterionic moieties, and combinations thereof. In some embodiments, the external hydrophilic functional groups on the star polymers include charged species with a net surface charge at neutral pH opposite to the charge of the polymer matrix of the TFC membrane support layer, which can cause the star polymers to self-assemble and form a hydrophilic layer within at least some of the pores of the support layer via electrostatic interaction. In other embodiments, functional groups on the star polymers can be selected to cause the star polymers to self-assemble in at least some of the pores of the support layer through other types of interactions including, for example, hydrogen bonding, metal coordination, van der Waals forces, and $\pi$-$\pi$ interactions.

In one aspect, the present disclosure is directed to a thin film composite (TFC) forward osmosis (FO) membrane including a porous support, wherein the pores in the support include surfaces having thereon a hydrophilic self-assembled monolayer; and an active layer on the support, wherein the active layer is sufficiently dense to remove an ionic species from a liquid.

In another aspect, the present disclosure is directed to a process of modifying a TFC FO membrane with hydrophilic-functionalized star polymers, including: exposing a porous support to an aqueous solution of hydrophilic-functionalized star polymers; and draining the excess star polymer solution.

In various embodiments, the self-assembled star polymer layer can improve the wetting behavior of the surfaces of the pores in the support membrane, which can improve transport of water and salts within the support layer and reduce ICP. In some embodiments, the TFC membranes with star polymer modified support layers can exhibit improved FO performance with higher water flux.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 1A is a schematic cross-sectional view of a region of a thin film composite (TFC) membrane.

FIG. 1B is a schematic cross-sectional view of a region of a TFC membrane including pores having surfaces with star polymers having hydrophilic functional groups.

FIG. 2(a) is a scanning electron microscope (SEM) image of a cross-section of a commercially available thin film composite (TFC) forward osmosis (FO) membrane having pores unmodified by star polymers.

FIG. 2(b) is a plan view SEM image of a bottom surface (porous support side) of a commercially available unmodified TFC FO membrane.

FIG. 2(c) is a plan view SEM image of a bottom surface (porous support side) of a commercially available unmodified TFC FO membrane.

FIG. 2(d) is a plan view SEM image of a bottom surface (porous support side) of a TFC FO membrane having pores modified with star polymer SP-1 of Example 1.

FIG. 2(e) is a plan view SEM image of a bottom surface (porous support side) of a TFC FO membrane having pores modified with star polymer SP-1 of Example 1, taken at position x1 (the porous polymer matrix) of FIG. 2(d).

FIG. 2(f) is a plan view SEM image of a bottom surface (porous support side) of a TFC FO membrane having pores modified with star polymer SP-1 of Example 1, taken at position x2 (along a mesh line on the bottom surface) of FIG. 2(d).

FIG. 2(g) is a plan view SEM image of a bottom surface (porous support side) of a TFC FO membrane having pores modified with star polymer SP-1 of Example 1, taken at position x3 (an inner-pore surface) of FIG. 2(d).

Like symbols in the drawings indicate like elements.

DETAILED DESCRIPTION

Figure 3:
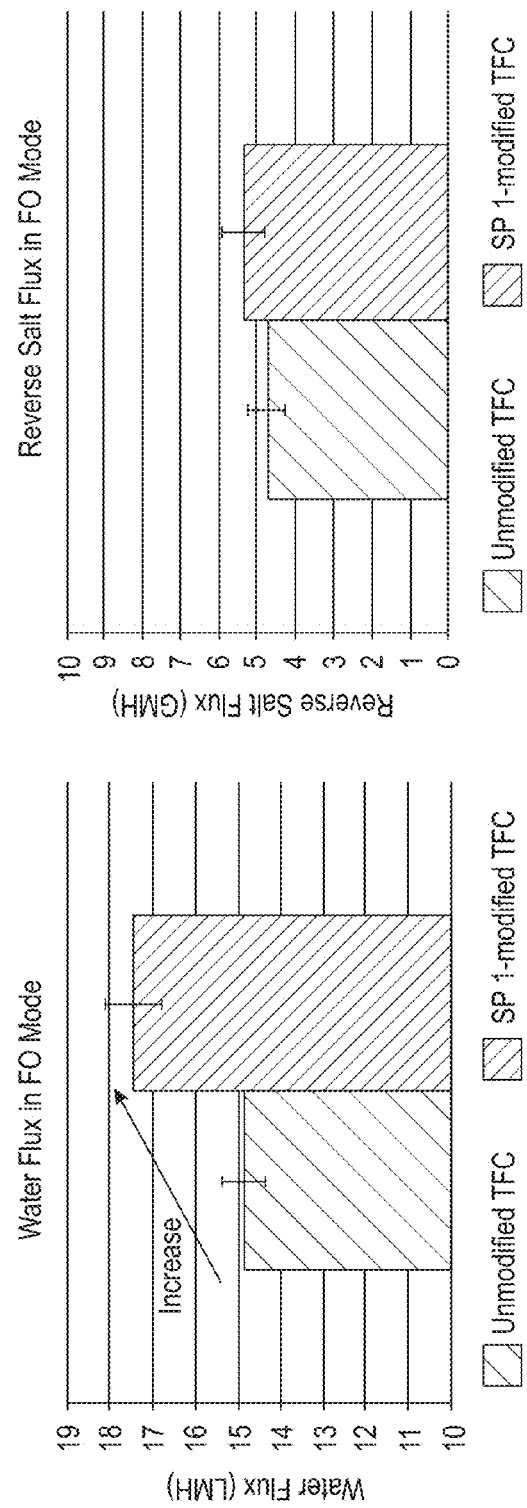
FIG. 3 includes plots of water flux and reverse salt flux with a 5 M NaCl draw solution and deionized (DI) water feed of unmodified and SP 1-modified TFC FO membranes of Example 1 evaluated in FO mode (active layer facing the feed solution).

FIG. 1A is a schematic cross-sectional view of a region of a thin film composite (TFC) membrane 10 including an active layer 12 on a porous support 14.

The porous support 14 overlain by the active layer 12 can vary widely depending on the intended application, can be flexible or rigid, and can include an organic material, an inorganic material, a hybrid organic-inorganic material, a metal material, or a combination of the foregoing materials. Exemplary organic materials for the support 14 include cellulose acetates, cellulose nitrates, regenerated celluloses, polysulfones, polyethersulfones, polypiperazine amides (such as those available under the trade designation FILMTEC from Dow Chemical, Midland, Mich.), polyacrylonitriles and copolymers, track-etched polyesters (e.g., those sold under the trade designation CYCLOPORE by Whatman Ltd.), polycarbonates (e.g., those sold under the trade designation NUCLEPORE by Whatman Ltd), poly (vinylidene difluoride), polypropylenes, Nylon 6,6, poly (tetrafluoroethylene)s (e.g., those sold under the trade names PORO-TEX and PARA-TEL by DeWAL Industries), and combinations of the foregoing materials.

Exemplary inorganic materials for the support 14 include nanoporous alumina ($Al_2O_3$) (e.g., those sold under the trade name ANOPORE by Whatman Ltd.), beryllia (BeO), titania ($TiO_2$), zirconia ($ZrO_2$), silica ($SiO_2$), magnesia (MgO), calcia (CaO), yttria ($Y_2O_3$), strontia (SrO), lanthana ($La_2O_3$), hafnia ($HfO_2$), oxides of iron, manganese oxide (MnO), carbides, nitrides, silicides, and combinations of the foregoing materials. Exemplary metals that may be included in the porous support 14 include, for example, nickel, nickel alloys, and stainless steel.

In various embodiments, the porous support 14 includes a plurality of pores 16 having an average pore diameter of about 1 to about 1000 nm, about 1 to 100 nm (0.1 μm), about 1 to 50 nm, about 2 to about 30 nm, and even more particularly about 5 to about 20 nm. In this application the term "pores" refers to regular and irregular voids and/or channels extending at least part way from one face to an opposite face of the porous support. The pores extend between the surfaces 20 of the matrix material making up the structure of the support 14.

Microfiltration (MF) stock membranes have an average pore size of about 0.1 micrometers and a molecular weight cutoff of about 500,000 Daltons. Ultrafiltration (UF) stock membranes have an average pore size of about 0.01 micrometers to about 0.1 micrometers and a molecular weight cutoff of about 1,000 Daltons to 500,000 Daltons. The pore size of poly(sulfone) (PSF) ultrafiltration stock membrane used in the examples below is about 5 to about 20 nm.

The support 14 can have a thickness of 1 micrometer to 10 millimeters, more particularly 1 μm to 100 μm, more particularly 1 μm to 80 μm, and even more particularly 1 μm to 50 μm.

In some embodiments, the support 14 can optionally be underlain by an additional support layer (not shown in FIG. 1A), which may be, for example, another membrane, a woven or a non-woven fibrous material, a polymeric film or a paper layer.

In some embodiments, the support 14 can optionally be reinforced by organic and/or inorganic fillers (not shown in FIG. 1A), which may be, for example, polyester woven mesh, carbon nanotubes, or zeolite nanoparticles.

In various embodiments, the active layer 12 includes any material with a density sufficient to render the active layer material capable of removing an ionic species from a feed solution. The active layer 12 may be a single layer, or may include multiple layers having the same or different compositions.

In one embodiment, the active layer 12 includes a first polyamide layer 13 derived from an interfacial polymerization reaction between an aqueous chemical mixture (A) and an organic chemical mixture (B) on the support 14. The aqueous chemical mixture (A) and the organic chemical mixture (B) are immiscible with each other. When the mixtures (A) and (B) are placed in contact, immiscible means that there is an interface between (A) and (B). The chemical mixtures (A) and (B) can independently be solutions, dispersions, or combinations thereof. Preferably, both (A) and (B) are solutions, and will be referred to in the discussion that follows as solutions.

The aqueous chemical mixture (A) includes a monomeric polyamine reactant represented by Formula 1:

$R(NH_2)_z$                                    Formula 1 wherein R represents an organic group selected from aliphatic, alicyclic, aromatic, heterocyclic groups and combinations thereof, and z represents an integer of 2 or more, 2 to 20, or 2 to 8. In this application, the recitations of numerical ranges by endpoints include all numbers subsumed within that range (e.g., 1 to 5 includes 1, 1.5, 2, 2.75, 3, 3.80, 4, 5, etc.). In some embodiments, R includes an aromatic group, and more preferably consists of one or more aromatic groups.

In some embodiments, R in the monomeric polyamine reactant of Formula 1 represents an organic group with 2 to 30 carbon atoms, or 2 to 20 carbon atoms, or 6 to 20 carbon atoms. For example, R can include an aromatic organic group selected from benzene rings, naphthalene rings, cyclohexane rings, admantane rings, norbornane rings and combinations thereof. In some embodiments, R in Formula 1 is a benzene ring, and z is equal to 2.

A base can be optionally added to aqueous solution (A) to improve the solubility of the monomeric polyamine reactants. The base used in the aqueous solution (A) may vary widely, and can include an organic base, an inorganic base, and combinations thereof. For example, the base in solution (A) can include inorganic hydroxides, organic hydroxides, carbonates, bicarbonates, sulfides, amines and combinations thereof. Suitable bases include, but are not limited to, NaOH, KOH, Ca(OH)$_2$, Na$_2$CO$_3$, K$_2$CO$_3$, CaCO$_3$, NaHCO$_3$, KHCO$_3$, triethyl amine, pyridine, tetramethylammonium hydroxide and combinations thereof.

The organic chemical mixture (B) includes a monomeric polyfunctional acyl halide reactant, represented by the Formula 2:

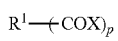

Formula 2 wherein R$^1$ represents an organic group selected from aliphatic alicyclic, aromatic, heterocyclic groups and combinations thereof, X is a halide selected from fluorine, chlorine, bromine and iodine, and p represents an integer of 2 or more, 2 to 20, or 2 to 8.

In some embodiments, R$^1$ in the polyfunctional acyl halide reactant of Formula 2 represents an organic group with 1 to 30 carbon atoms, or 1 to 20 carbon atoms, or 1 to 15 carbon atoms. In some embodiments, in the polyfunctional acyl halide reactant of Formula 2, R$^1$ can include an organic group selected from benzene rings, naphthalene rings, cyclohexane rings, admanthane rings, norbornane rings and combinations thereof.

In some embodiments, R$^1$ in the polyfunctional acyl halide reactant of Formula 2 represents an organic group represented by Formula 12,

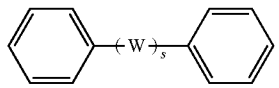

Formula 12 wherein W represents an organic group selected from CH$_2$, O, S, C=O, SO$_2$, C(CH$_3$)$_2$, C(CF$_3$)$_2$ and combinations thereof, s represents an integer of 0 or 1, and monovalent COX is chemically bonded to the benzene rings, wherein X is independently selected from fluorine, chlorine, bromine and iodine.

In some embodiments, the monomeric polyfunctional acyl halide reactant in solution (B) includes at least one of a divalent organic compound represented by Formula 10 or a trivalent organic compound represented by Formula 11:

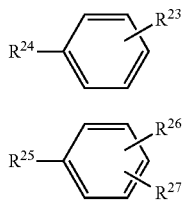

Formula 10

Formula 11 wherein R$^{23}$, R$^{24}$, R$^{25}$, R$^{26}$ and R$^{27}$ are each independently selected from monovalent COX, wherein X is independently selected from fluorine, chlorine, bromine and iodine.

In other embodiments, the monomeric polyfunctional acyl halide reactant in solution (B) includes at least one of a compound selected from a trivalent organic compound represented by Formula 13 or a divalent organic compound represented by Formula 14:

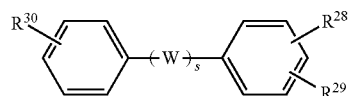

Formula 13

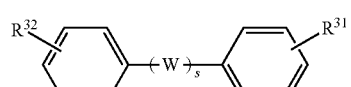

Formula 14 wherein R$^{28}$, R$^{29}$, R$^{30}$, R$^{31}$ and R$^{32}$ are each independently selected from monovalent COX, and X is independently selected from fluorine, chlorine, bromine and iodine, wherein W represents an organic group selected from CH$_2$, O, S, C=O, SO$_2$, C(CH$_3$)$_2$, C(CF$_3$)$_2$ and combinations thereof, and wherein s represents an integer of 0 or 1.

In other embodiments, the monomeric polyfunctional acyl halide reactant in solution (B) includes a compound selected from any of the compounds in Formulas 37 through 61, and combinations thereof:

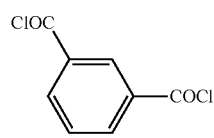

Formula 37

Formula 38

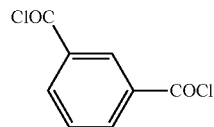

Formula 39

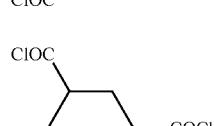

Formula 40

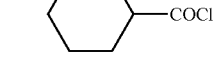

Formula 41

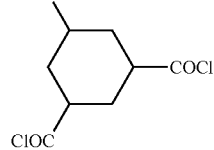

Formula 42

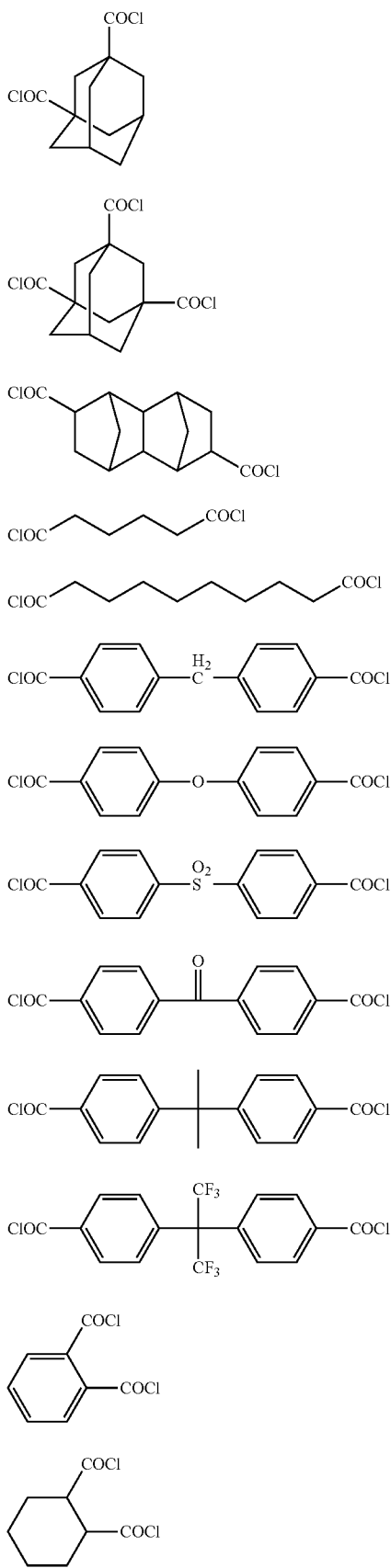

Formula 43
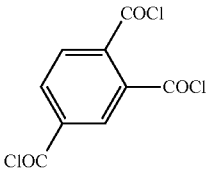

Formula 44
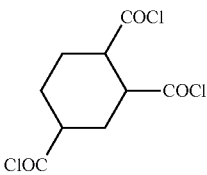

Formula 45
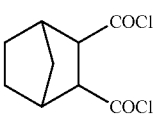

Formula 46
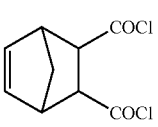

Formula 47
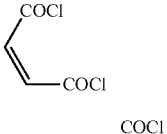

Formula 48
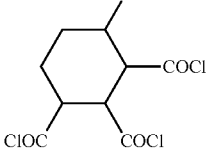

Formula 49
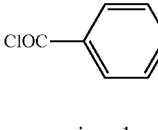

Formula 48
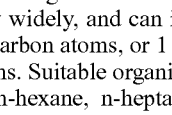

Formula 50
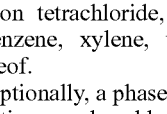

Formula 51
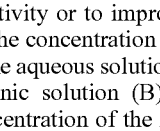

Formula 52
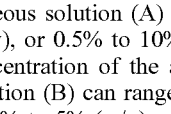

Formula 53

Formula 54

Formula 55

Formula 56

Formula 57

Formula 58

Formula 59

Formula 60

Formula 61

The organic solvent used in the organic solution (B) may vary widely, and can include organic compounds with 1 to 20 carbon atoms, or 1 to 16 carbon atoms, or 1 to 12 carbon atoms. Suitable organic solvents include, but are not limited to, n-hexane, n-heptane, n-octane, n-decane, n-dodecane, carbon tetrachloride, chloroform, dichloromethane, chlorobenzene, xylene, toluene, benzene and combinations thereof.

Optionally, a phase transfer catalyst or surfactant or other additives can be added to solution (A) and/or (B) to enhance reactivity or to improve membrane performance.

The concentration of the monomeric polyamine reactants in the aqueous solution (A) or the acyl halide reactants in the organic solution (B) can vary widely. For example, the concentration of the monomeric polyamine reactants in the aqueous solution (A) can range from 0.01% (w/v) to 20% (w/v), or 0.5% to 10% (w/v), or 1% to 5%. Similarly, the concentration of the acryl halide reactants in the organic solution (B) can range from 0.01% (w/v) to 10% (w/v), or 0.05% to 5% (w/v), or 0.1% to 2%.

The functional groups on the monomeric reactants are selected to provide a crosslinked polymeric reaction product. For example, diamine monomers will always make a crosslinked polyamide by reacting with trimesoyl chloride (TMC). After the interfacially polymerized, crosslinked aromatic polyamide has been formed, its crosslink density can be further increased by post-polymerization reactions with crosslinking or molecular weight-increasing agents such as methane sulfonyl halides, epihalohydrins, trimethylamine-sulfur trioxide complex, formaldehyde, glyoxal, and the like.

In some embodiments, the crosslinked polyamide layer 13 formed on the support 14 by the reaction between solution (A) and solution (B) includes free acid halide groups that did not react with all of the amines in the interfacial polymerization step. These unreacted acid halides eventually hydrolyze to carboxylic acid groups as normally observed at the surface of reverse osmosis (RO) membranes. However, this hydrolysis reaction is relatively slow, and in some embodiments additional second crosslinked polyamide layers 15 can optionally be formed on the crosslinked polyamide layer 13 by reacting the unreacted acid halides in the layer 13 with an aqueous, basic chemical mixture (C). The chemical mixture (C) includes a monomeric polyamine reactant that is structurally different from the polyamine reactant in the chemical mixture (A). Like the chemical mixtures (A) and (B) above, the chemical mixture (C) can be a solution, a dispersion, or a combination thereof. Preferably, like both chemical mixtures (A) and (B), the chemical mixture (C) is a solution. The surface of the first crosslinked polyamide layer 13 has multiple unreacted acid chloride groups, which react with diamines in the chemical mixture (C) to form the second crosslinked polyamide layer 15.

In one non-limiting embodiment, the chemical mixture (C) includes a monomeric polyamine reactant having a fluoroalcohol moiety. In one preferred embodiment, the chemical mixture (C) includes a monomeric polyamine reactant having one or more hexafluoroalcohol groups, represented by Formula 1A:

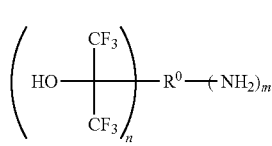

Formula 1A wherein
$R^0$ represents an organic group selected from aliphatic, alicyclic, aromatic, heterocyclic groups and combinations thereof, n represents an integer of 1 or more, 1 to 20, or 1 to 8; and m represents an integer of 2 or more, 2 to 20, or 2 to 8.

In some embodiments, $R^0$ in the monomeric polyamine reactant of Formula 1A represents an organic group with 2 to 30 carbon atoms, or 2 to 20 carbon atoms, or 6 to 20 carbon atoms. For example, $R^0$ can include an aromatic organic group selected from benzene rings, naphthalene rings, cyclohexane rings, admanthane rings, norbornane rings and combinations thereof.

In one embodiment particularly well suited for making the second polyamide layer 15, hexafluoroalcohol substituted aromatic diamines (for example, HFA-MDA and HFA-ODA) in aqueous solution (C) may be reacted with the unreacted halide groups on an aromatic acid chloride such as trimesoyl chloride (TMC) in the layer 13 (see Reaction 1 below). The top-surface of the layer 13 contains unreacted free amines because the interfacial polymerization occurs in an excess amine solution having a limited amount of acid chlorides available for reaction.

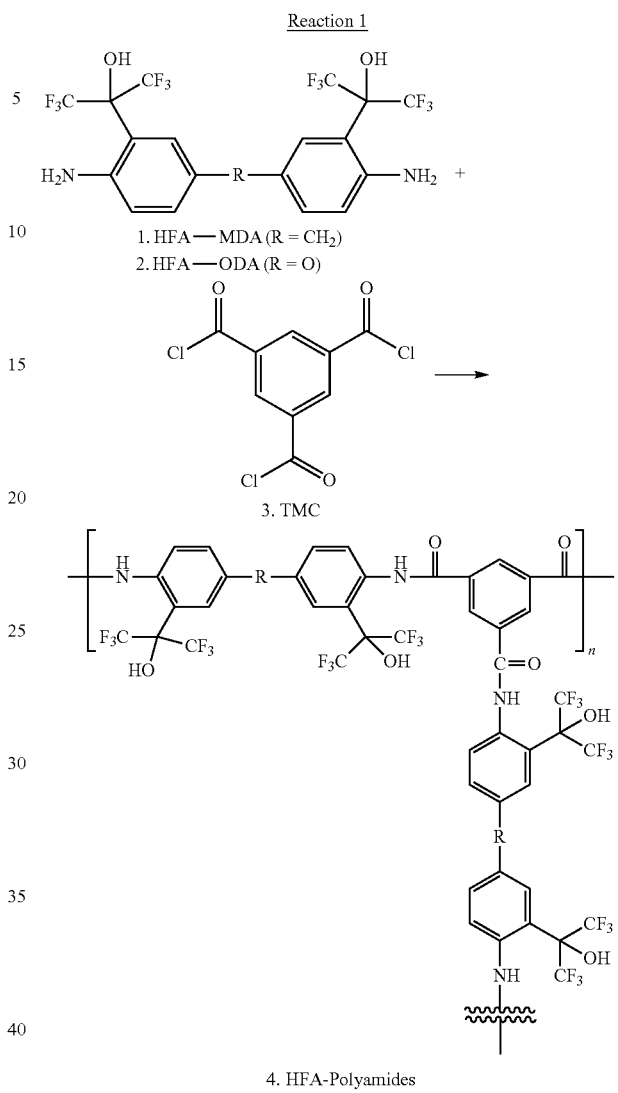

4. HFA-Polyamides

In another embodiment, the active layer 12 is made of a plurality of layers 13, 15 of star polymers stacked on one another. In this disclosure the term "star polymer" refers to branched polymers made of a plurality of linear polymers (at least three) attached at a central core. The core, or the center, of the star polymer can be an atom, molecule, or macromolecule, and in some embodiments may itself be multifunctional. The chains, or "arms," of the star polymer consist of variable-length organic chains, which can be made of similar or different polymers. The arms can be chemically identical (homostars) or different (heterostars or Miktoarm stars). In other embodiments, the arms may be composed of multiple monomers or polymers, resulting in star-block polymers or random star copolymers.

Star-shaped polymers can be synthesized through various approaches. The most common syntheses include an arm-first approach, in which the living chains are used as the initiators, and a core-first approach, in which the core is used as the initiator. Other synthetic routes include: controlled sol-gel processes, group transfer polymerization, transition metal catalysis, living anionic polymerization, living cationic polymerization, ring opening polymerization, ring-opening metathesis polymerization (ROMP), atom transfer radical polymerization (ATRP), reversible addition-fragmentation chain transfer polymerization (RAFT) and nitroxide mediated radical polymerization.

The Matyjaszewski group at Carnegie Mellon University provides general information regarding the structure and synthesis of various star copolymers at the concatenation of cmu.edu and maty/materials/Polymers with Specific Architecture/star-copolymers.

While a wide variety of star polymers may be used to form the layers 13, 15 in the active layer 12 of the membrane 10, in some embodiments the functional groups on the arms of the star polymers are selected so that the star polymers "self-assemble" to form the active layer 12. In some embodiments, the term "self-assemble" means the star polymers align and overlie one another in an organized structure or pattern of building blocks to form the layers 13, 15 of the active layer 12 as a consequence of specific, local interactions among the functional groups on the arms. The interactions between the functional groups, which can be, for example, the result of any of electrostatic charge interaction or electronic (for example, charge transfer) interaction or hydrogen bonding or metal-ligand interaction, cause the star polymers to align to form individual barrier layers. The layers lie down one over the other without external direction to form an arrangement of overlying individual barrier layers.

For example, if the porous support 14 has a first surface 17 with a potential (either positive or negative), a first star polymer may be selected having functional groups on its arms with a second surface potential opposite the first surface potential. When the first star polymer is applied to the porous support membrane, electronic charge interaction and/or hydrogen bonding will cause the first star polymer to adhere to the support membrane and form a self-limiting first individual barrier layer thereon. A second star polymer may then be selected having functional groups on its arms with a third surface potential opposite the second surface potential of the first star polymer. When the second star polymer is applied on the first star polymer, electronic charge interaction and/or hydrogen bonding will cause the second star polymer to lie down on and adhere to the first star polymer, forming a second individual barrier layer thereon. Another first star polymer may then be applied on the second barrier layer to form a third individual barrier layer thereon, and another second star polymer may be applied on the third barrier layer to form a fourth barrier layer. The first star polymer and the second star polymer may be successively applied like building blocks to form multiple layer pairs in this manner until the active layer is formed.

For example, in one embodiment a first globularly shaped star polymer with a globular core and at least some arms functionalized with ammonium moieties to provide a positive surface charge was paired with a second globular shaped star polymer having a globular core and arms containing mixed functional groups of negatively charged carboxylate ($COO^-$) and electrically neutral hydrophilic poly(ethylene glycol) (PEG) or zwitterionic moieties to provide a negative surface charge.

In various embodiments, other positively-charged moieties for the arms of star polymers, which can potentially cause the positively-charged star polymers to electrostatically self-assemble with star polymers having negatively-charged moieties on their arms include, but are not limited to, ammonium, phosphonium and sulfonium cations, as well as functional groups reasonably anticipated to become cationic in aqueous or acidic solution such as, for example, amines.

Non-limiting examples of useful negatively-charged moieties for the arms of star polymers, which can potentially cause the negatively-charged star polymers to electrostatically self-assemble with star polymers having positively-charged moieties on their arms include, but are not limited to, carboxylates, sulfonates, sulfinates, phosphates, phosphinates, phosphonates and hydroxamic acids.

Non-limiting examples of other useful moieties for the arms of star polymers, which can be used to potentially cause the star polymers to self-assemble with other star polymers using hydrogen bonding include, but are not limited to, hydrogen donors including alcohols or weak acids (COOH) with hydrogen acceptors containing ketones (for example, poly(N-vinylpyrrolidone)), amide (for example, poly(N-isopropylacrylamide), ureas, thioureas, guanidines and alkylene oxide (for example, polyethylene oxide) moieties.

In various embodiments, the layers 13, 15 of the star polymers have a thickness of about 5 nm to about 50 nm, or about 5 nm to about 20 nm.

While any number of layers of star polymers may be applied to the surface 17 of the support 14, in various embodiments at least 4, at least 6, at least 8, or at least 10 barrier layers have been applied to provide a membrane with optimum filtration performance and surface properties.

In various embodiments, an active layer for a FO membrane can be prepared by preparing solutions of star polymers with positively-charged functional groups on the arms (SPP) and solutions of star polymers with negatively-charged (SPN) polymers on the arms. Any solvent that can dissolve the star polymers (but is a non-solvent for the supporting membranes) may be used, and suitable examples include, but are not limited to, alcohols, halogenated solvents, aromatic solvents, and aqueous solvents. Aqueous solvents, alcohols, and water have been found to be particularly useful.

The solutions of the SPP and SPN star polymers can be applied in serial order through multiple cycles of layer-by-layer (LBL) assembly to form the barrier layers on the porous substrate. The SPP and SPN star polymer solutions may be applied to the substrate in any order, and optional water rinses may be conducted between applications to rinse away unreacted polymer.

In various embodiments, chemical or physical treatments (e.g., plasma or UV-ozone) can optionally be applied to the surface 17 of the support 14 prior to applying the star polymer solutions, to increase the packing-density of the first layer on the surface of the support.

FIG. 1B is a schematic cross-sectional view of a region of thin film composite (TFC) membrane 110 including an active layer 112 on a porous support 114. In many respects, the elements of the membrane 110 are the same as described above for the membrane 10 of FIG. 1A, but at least a portion of the surfaces 120 in the pores 116 of the matrix material making up the support 114 include a hydrophilic layer 122 of a star polymer.

As discussed above with reference to FIG. 1A, the star polymers making up the hydrophilic layer 122 are branched polymers made of a plurality of linear polymers attached at a central core.

The core, or the center, of the star polymer can be an atom, molecule, or macromolecule, or a globular nanogel (i.e., a cross-linked polymer gel of nanoscale proportions) and in some embodiments may itself be multifunctional. In various embodiments, the core contains aromatic, aliphatic, or mixed substituents with carbon only or mixtures containing heteroatoms. In some embodiments, the core is crosslinked with a plethora of surface functionality. In some embodiments, the core retains its shape by covalent crosslinking, although it could also be held together by electrostatic, hydrogen bonding, pi-stacking, or metal-ligand interactions.

The chains, or "arms," of the star polymer consist of variable-length organic chains, which can be made of similar or different polymers. The arms can be chemically identical (homostars) or different (heterostars or Miktoarm stars). In other embodiments, the arms may be composed of multiple monomers or polymers, resulting in star-block polymers or random star copolymers. In various embodiments, the star polymers include at least 6, or at least 10, or at least 20, or at least 30, or at least 60, arms covalently attached to the core.

Star-shaped polymers can be synthesized through various approaches. The most common syntheses include an arm-first approach, in which the living chains are used as the initiators, and a core-first approach, in which the core is used as the initiator. Other synthetic routes include: controlled sol-gel processes, group transfer polymerization, transition metal catalysis, living anionic polymerization, living cationic polymerization, ring opening polymerization, ring-opening metathesis polymerization (ROMP), atom transfer radical polymerization (ATRP), reversible addition-fragmentation chain transfer polymerization (RAFT) and nitroxide mediated radical polymerization.

While a wide variety of star polymers may be used to form the hydrophilic layer 122 on the surfaces 120 of the matrix material making up the support 114, in some embodiments the functional groups on the arms of the star polymers are selected so that the star polymers "self-assemble" to form the hydrophilic layer 122. As noted above, the term "self-assemble" means the star polymers align and overlie one another in an organized structure or pattern of building blocks to form the hydrophilic layer 122 as a consequence of specific, local interactions among the functional groups on the arms. The interactions between the functional groups, which can be, for example, the result of any of electrostatic charge interaction or electronic (e.g., charge transfer) interaction, hydrogen bonding, metal-ligand interaction, or π-π interaction, cause the star polymers to align to form the hydrophilic layer 122. The star polymers lie down on one another without external direction to form the hydrophilic layer 122.

For example, if the porous support 114 has surfaces 120 in its pores 116 of a matrix material having a potential (either positive or negative), a star polymer may be selected having functional groups on its arms with a surface potential opposite the surface potential of the surfaces 120. When the star polymer is applied to the surfaces 120, electronic charge interaction and/or hydrogen bonding will cause the star polymer to adhere to the surface 120 and form a hydrophilic layer 122 thereon.

As is evident from the discussion above, a wide variety of star polymers containing hydrophilic functional moieties in their arms can be used to form the hydrophilic layer 122 in the pores 116 of the support 114 in FIG. 1B, which can minimize internal concentration polarization when the TFC membrane 110 is used in a forward osmosis (FO) process. In various embodiments, the hydrophilic arms of the star polymers can include positively charged moieties, neutral hydrophilic moieties, negatively charged moieties, zwitterionic moieties, and combinations thereof.

In various embodiments, positively-charged moieties for the arms of star polymers include, but are not limited to, ammonium, phosphonium and sulfonium cations, as well as functional groups reasonably anticipated to become cationic in aqueous or acidic solution such as, for example, amines.

Non-limiting examples of useful negatively-charged moieties for the arms of star polymers include carboxylates, sulfonates, sulfinates, sulfonamides, phosphates, phosphinates, phosphonates, hydroxyamic acids, and imides.

Non-limiting examples of other useful moieties for the arms of star polymers include, but are not limited to, hydrogen donors including alcohols or weak acids (COOH) with hydrogen acceptors containing ketones (for example, poly(N-vinylpyrrolidone)), amide (for example, poly(N-isopropylacrylamide) or hydroxyalkylamide), esters (for example, hydroxyalkylesters), ureas, thioureas, guanidines and alkylene oxide (for example, polyethylene oxide) moieties.

In one non-limiting embodiment, a suitable amine-functionalized star polymer is shown in the Formula 3(a) below:

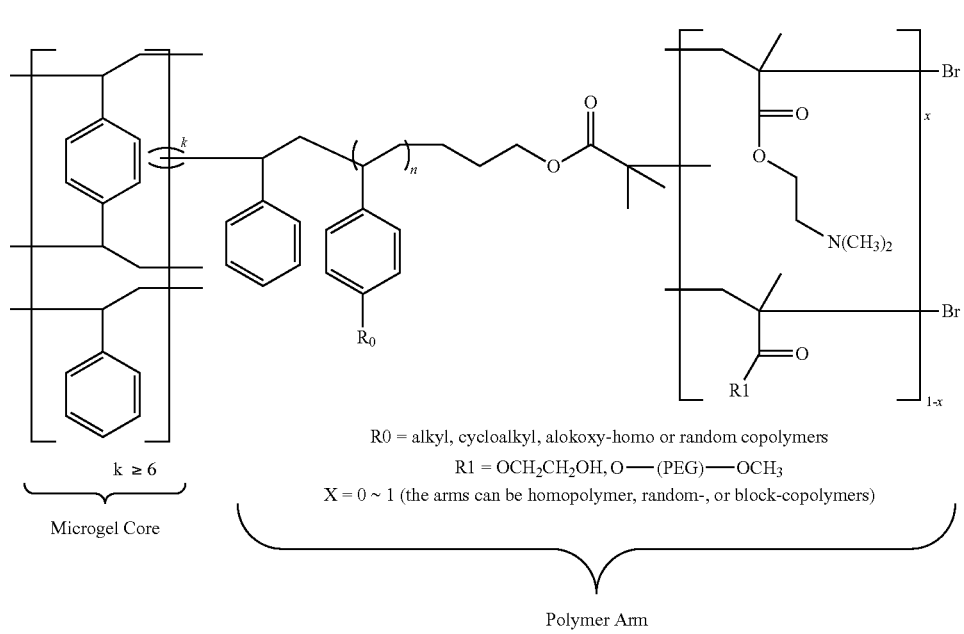

Formula 3(a)

$R_0$ = alkyl, cycloalkyl, alokoxy-homo or random copolymers
$R_1$ = $OCH_2CH_2OH$, O—(PEG)—$OCH_3$
X = 0 ~ 1 (the arms can be homopolymer, random-, or block-copolymers)

k ≥ 6

Microgel Core

Polymer Arm

In Formula 3(a), the star polymer includes a polymeric globular nanogel core with aromatic monomeric units and an arrangement of 6 or more, 10 or more, 20 or more, 30 or more, or 60 or more, polymeric arms attached to the nanogel core.

As noted in Formula 3(a), a linking portion of the polymeric arms attached to the nanogel core is formed from n units of homopolymers or random copolymers with monomeric units including alkyl, cycloalkyl, alkoxy, and combinations thereof, wherein n is about 10, or about 20, or about 30, or about 50, or about 60.

In various embodiments, the functional regions of the polymeric arms include functional groups with moieties such as $N(CH_3)_2$, $OCH_2CH_2OH$, or $O\text{-}(PEG)\text{-}OCH_3$, wherein PEG is poly(ethylene glycol), and combinations thereof. In some embodiments, the ester linkage in Formula 3(a) could be replaced by amides.

In Formula 3(a), x is greater than or equal to about 0 and less than or equal to about 1, which indicates the functional regions of the polymeric arms can be homopolymers, random polymers or block copolymers. The tether length in the charge-generating side chains can range from 2 to 6 carbon atoms and the tether can be linear or branched. The tether also can contain atoms other than carbon such as sulfur, oxygen, or nitrogen depending on the solvent solubility desired. In various embodiments, the hydrophilic arms of the star polymer of Formula 3(a) can include 100% amine moieties (homopolymer) when x=1, or the amine moiety can be mixed with hydrophilic neutral species (R1, for example, PEG) when x is greater than 0 and less than 1 (random or block copolymers). The functional groups on the arms can thus be selected to form various compositions to tailor the hydrophilicity of the hydrophilic layer 122.

In various embodiments, the functional region of the star polymer of Formula 3(a) can include $N(CH_3)_2$ containing monomers in an amount varying from 0 mol % to 100 mol %. In one example embodiment, the functional region of the star polymer of Formula 3(a) includes 100 mol % amine-containing monomers (x=1 in Formula 3(a)). In another example embodiment, the functional region of the star polymer of Formula 3(a) includes 55 mol % of $N(CH_3)_2$-containing monomers and 45 mol % of a polyethylene glycol (PEG)-containing monomers (x=0.55 in Formula 3(a)). In another example embodiment, the functional region of the star polymer of Formula 3(a) includes 75 mol % PEG-containing monomers and 25 mol % $N(CH_3)_2$-containing monomers (x=0.25 in Formula 3(a)). In yet another example embodiment, the functional region of the star polymer of Formula 3(a) includes 100 mol % PEG-containing monomers (x=0 in Formula 3(a)).

Another non-limiting embodiment of a carboxyl-functionalized star polymer suitable for forming the hydrophilic layer 122 in FIG. 1B is shown below in Formula 3(b):

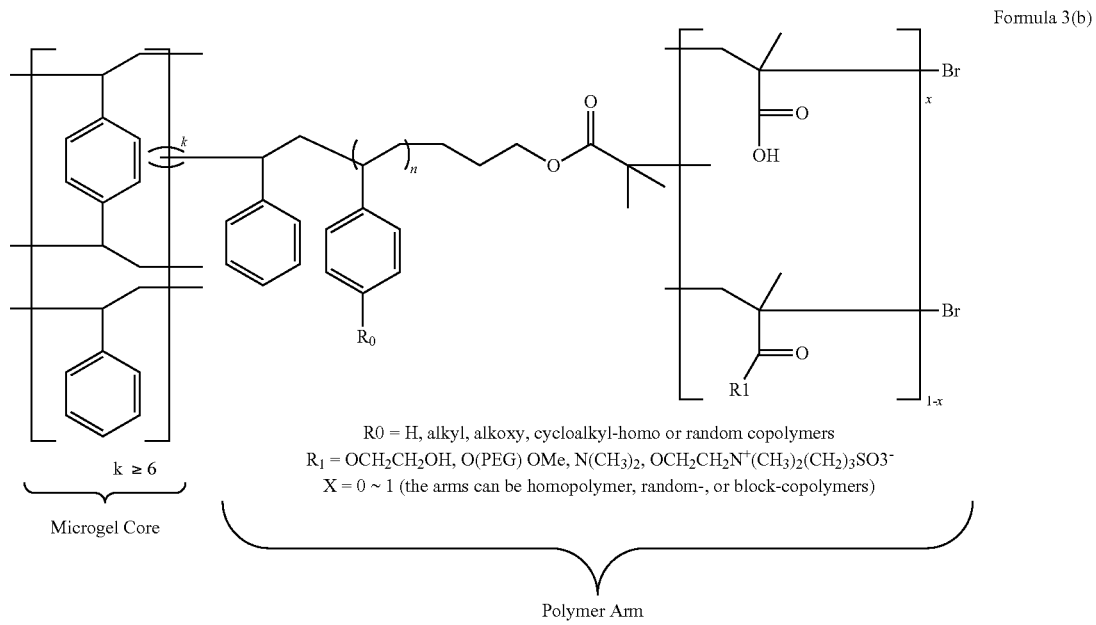

Formula 3(b)

R0 = H, alkyl, alkoxy, cycloalkyl-homo or random copolymers
R1 = $OCH_2CH_2OH$, O(PEG) OMe, $N(CH_3)_2$, $OCH_2CH_2N^+(CH_3)_2(CH_2)_3SO_3^-$
X = 0 ~ 1 (the arms can be homopolymer, random-, or block-copolymers)

k ≥ 6
Microgel Core
Polymer Arm

In Formula 3(b), the star polymer includes a polymeric globular nanogel core with aromatic monomeric units and an arrangement of 6 or more, 10 or more, 20 or more, 30 or more, or 60 or more, polymeric arms attached to the nanogel core.

A linking portion of the polymeric arms attached to the nanogel core are formed from n units or homopolymers or random copolymers with monomeric units including H, alkyl, cycloalkyl, alkoxy, and combinations thereof, wherein n is about 10, about 20, about 30, about 50, or about 60.

The functional regions of the polymeric arms distal the nanogel core include functional groups with moieties such as COOH, $OCH_2CH_2OH$, or O-(PEG), $OCH_3$, $N(CH_3)_2$, $OCH_2CH_2N^+(CH_3)_2(CH_2)_3SO_3^-$, and combinations thereof.

In Formula 3(b), x is greater than or equal to about 0 and less than or equal to about 1, which indicates the functional regions of the polymeric arms can be homopolymers, random polymers or block copolymers. In various embodiments, the hydrophilic arms of the star polymer can include 100% carboxylate-containing monomers (homopolymer) when x=1. In some embodiments, the carboxylate moiety can be mixed with hydrophilic neutral species (R1, for example, PEG) when x is greater than 0 and less than 1 (random or block copolymers). The functional groups on the arms can thus be selected to form various compositions to tailor the hydrophilicity of the hydrophilic layer 122.

In various embodiments, the functional region of the star polymer of Formula 3(b) can include COOH containing monomers in a ratio varying from 0 mol % to 100 mol %. In one example embodiment, the star polymer of Formula 3(b) includes hydrophilic arms with 100 mol % COOH-containing monomers (x=1 in Formula 3(b)). In another example embodiment, the star polymer of Formula 3(b) includes arms with 35 mol % of COOH-containing monomers and 65 mol % of polyethylene glycol (PEG)-containing monomers (x=0.35 in the Formula 3(b)). In another example embodiment, the star polymer of Formula 3(b) includes arms with 25 mol % COOH-containing monomers and 75 mol % PEG-containing monomers (x=0.25 in Formula 3(b)). In another example embodiment, the star polymer of Formula 3(b) includes arms with 100 mol % PEG-containing monomers (x=0 in Formula 3(b)).

The star polymer layer 122 on the surfaces 120 of the matrix of the porous support 114 of the TFC FO membrane 110 can effectively change the wettability of the pore surfaces 120, making them more hydrophilic. The hydrophilic nature of the layer 122 can enhance water transport (diffusion) within the support layer 114, resulting in significant reduction of internal concentration polarization (ICP). The hydrophilic layer 122 can allow retention of a higher osmotic pressure gradient across the membrane 110, which can improve FO performance.

In another aspect, the present disclosure is directed to a process of modifying the wettability of the surfaces of the pores of a support layer of a TFC membrane. In this process the hydrophilicity of the surfaces of the pores of the support layer is altered by applying to the support layer a star polymer having hydrophilic functional moieties on the exposed arms thereof to form on the pore surfaces a hydrophilic region or layer.

In one embodiment, the process includes exposing a porous support having an active layer thereon to a solution of a hydrophilic-functionalized star polymer for a time sufficient to form a hydrophilic region or layer on the surfaces of the pores of the support. In various embodiments, the star polymer solution can include any solvent that is compatible with other membrane materials, and water and alcohols have been found to be suitable. In some embodiments, the solvent in the star polymer solution is aqueous, or water. In various embodiments, the star polymer is present in the star polymer solution at a concentration of about 0.01 wt % to about 10 wt %, about 0.1 wt % to about 5 wt %, about 0.1 wt % to about 1 wt %, or about 0.1 wt % to about 0.5 wt %.

In various embodiments, the porous support is exposed to the aqueous solution of the hydrophilic star polymer for about 1 minute to about 5 hours. Following exposure to the aqueous star polymer solution, the treated porous support may optionally be drained to remove excess star polymer solution.

In some embodiments, the treated porous support may optionally be dried by heating in an oven or exposure to ambient or heated air.

In various embodiments, the porous support may optionally be rinsed with a solvent prior to or after the draining step, and suitable solvents include water, particularly deionized water.

The TFC composite membrane may then be incorporated into a FO or PRO apparatus for use in, for example, seawater desalination, wastewater treatment, emergency relief, or power generation.

Various aspects of the present invention will now be demonstrated with reference to the following non-limiting examples.

EXAMPLES

General Information on the Materials

Star polymers with the structures shown in FIG. 1B were synthesized by the processes described in the U.S. Pat. No. 8,765,098, which is incorporated herein by reference in its entirety.

Sodium chloride (NaCl) purchased from J. T. Baker (Phillipsburg, N.J.) was used to prepare 1M and draw solutions.

Commercial forward osmosis (FO) thin film composite (TFC) membranes with an embedded polyester screen support available under the trade designation HTI OsMem TFC-ES from Hydration Technology Innovations (HTI), LLC (Albany, Oreg.) were used in the examples below. Per manufacturer specifications, the membranes were soaked for 30 minutes in deionized (DI) water to extract glycerin and stored in DI water until membrane modification and/or testing were conducted.

Evaluation of FO Performance

Modified and unmodified TFC FO membranes were evaluated in both FO (active layer facing the feed solution) and pressure retarded osmosis (PRO) (active layer facing the draw solution) modes by using a cross-flow FO system purchased from Sterlitech (Kent, Wash.). A NaCl solution was used for a draw solution (1M for PRO mode and 5 M for FO mode), and deionized water was used for the feed.

The FO system consisted of a feed tank, draw solution tank, two gear pumps, and a membrane cell (42 cm$^2$ active membrane area). The system was run with concurrent flow at a 0.25 m/s cross-flow velocity, and temperatures for the feed and draw solutions were cooled to 20±0.5° C. using a refrigerated circulator (Model: CFT-33, Neslab). The draw solution and feed solution tanks each contained 2 L of solution. For each membrane, water flux and reverse salt flux data were obtained over a 15-minute time interval. Water flux was recorded by measuring the volume change of the draw solution with respect to time by placing a scale underneath the tank. Reverse salt flux was measured by recording the change in conductivity of the feed solution with respect to time. Data were recorded automatically every 30 seconds.

Water flux was calculated using Equation 1:

$$J_w = \frac{\Delta V}{A \cdot \Delta t} \qquad (1)$$

wherein $J_w$ is the water flux, $\Delta V$ is the volume change of the draw solution, A is the effective membrane area, and $\Delta t$ is the time elapsed.

The reverse salt flux was determined from Equation 2:

$$J_B = \frac{C_t \cdot V_t - C_0 \cdot V_0}{A \cdot \Delta t} \qquad (2)$$

wherein $C_t$ and $C_0$ were the final and initial salt concentrations, and $V_t$ and $V_0$ were the final and initial feed solution volumes.

Example 1

Modification of Porous Support of TFC FO Membrane with Star Polymer SP 1

The SP 1 star polymer used in Example 1 contained hydrophilic arms with 55 mol % of an amine moiety ($N(CH_3)_2$) and 45 mol % of a polyethylene glycol moiety (x=0.45 in Formula 3(a)).

A pre-wetted TFC FO membrane from HTI, LLC was placed inside a frame to allow coating of only the porous support side of the membrane. Using an air knife, excess water was removed, and 0.1 wt % of the SP 1 star polymer solution in water was added to the frame. After 2 hours, the star polymer solution was removed and the membrane was dried with an air knife for 5 seconds, then rinsed with DI water and stored in the water until membrane evaluation.

FIG. 2 shows SEM images of the unmodified ((a)~(c)) and modified ((d)~(g)) TFC FO membranes from HTI, respectively. As shown in the cross-sectional view (FIG. 2(a)), a very thin polyamide active layer (100~200 nm, not clearly visible in the given magnification) was supported by a porous support layer, which is reinforced by a mesh. The bottom of the TFC membrane surface had macroscopic openings between mesh lines and a porous polymer matrix (FIG. 2(b)), but there were no characteristic nano-scale features on the bottom surface as confirmed by the magnified SEM image (FIG. 2(c)) of the unmodified FO membrane.

For the TFC membranes modified with hydrophilic star polymers (FIGS. 2(d)~(g)) on its porous support, we observed well-assembled nano-scale dots (about 30 nm), not only on the membrane bottom surface including the porous polymer matrix (FIG. 2(e): x1 position of FIG. 2(d)) and on a mesh line (FIG. 2(f): x2 position of FIG. 2(d)) but also on the surface of the inner-pores of the membrane (FIG. 2(g): x3 position of FIG. 2(d)).

Figure 4:
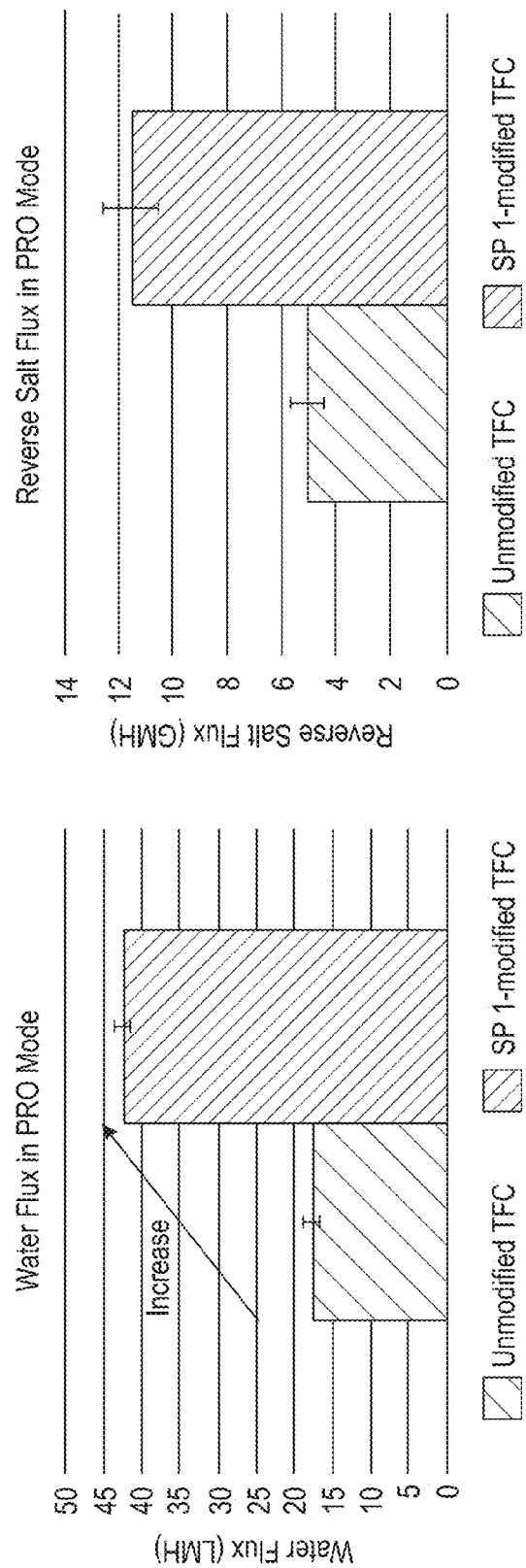
FIG. 4 includes plots of water flux and reverse salt flux with a 1 M NaCl draw solution and deionized (DI) water feed of unmodified and SP 1-modified TFC FO membranes of Example 1 evaluated in PRO mode (active layer facing the draw solution).

FIGS. 3-4 show the water flux and reverse salt flux performance of SP 1-modified and unmodified TFC FO membranes measured in FO mode and PRO mode, respectively.

For the FO mode evaluation (FIG. 3), the SP 1-modified TFC FO membrane demonstrated higher water flux (×1.2) than the unmodified membrane while retaining very similar reverse salt flux.

The modified membrane also showed 2.4 times higher water flux in the PRO mode evaluation (FIG. 4). However, the reverse salt flux was slightly increased as well in this case. While not wishing to be bound by any theory, presently available evidence indicates that the increased reverse salt flux is due to the fact that the salts transferred from the draw solution across the polyamide active layer could diffuse out to the feed solution with greater ease without isolating within the porous support layer, which could be a strong evidence of reduced ICP.

Example 2

Modification of Porous Support of TFC FO Membrane with Star Polymer SP 2

A star polymer designated herein as SP 2 contained the hydrophilic arms with 100 mol % of an amine moiety (x=1 in the Formula 3(a) above).

Figure 5:
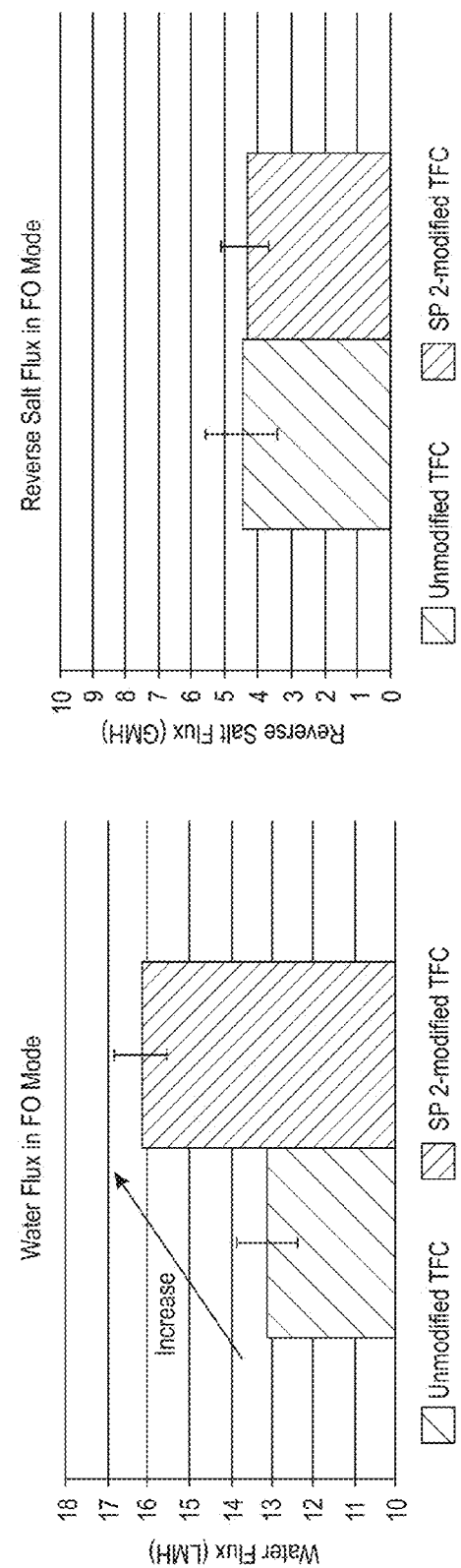
FIG. 5 includes plots of water flux and reverse salt flux with a 5 M NaCl draw solution and deionized (DI) water feed of unmodified and SP 2-modified TFC FO membranes of Example 2 evaluated in FO mode (active layer facing the feed solution).
Figure 6:
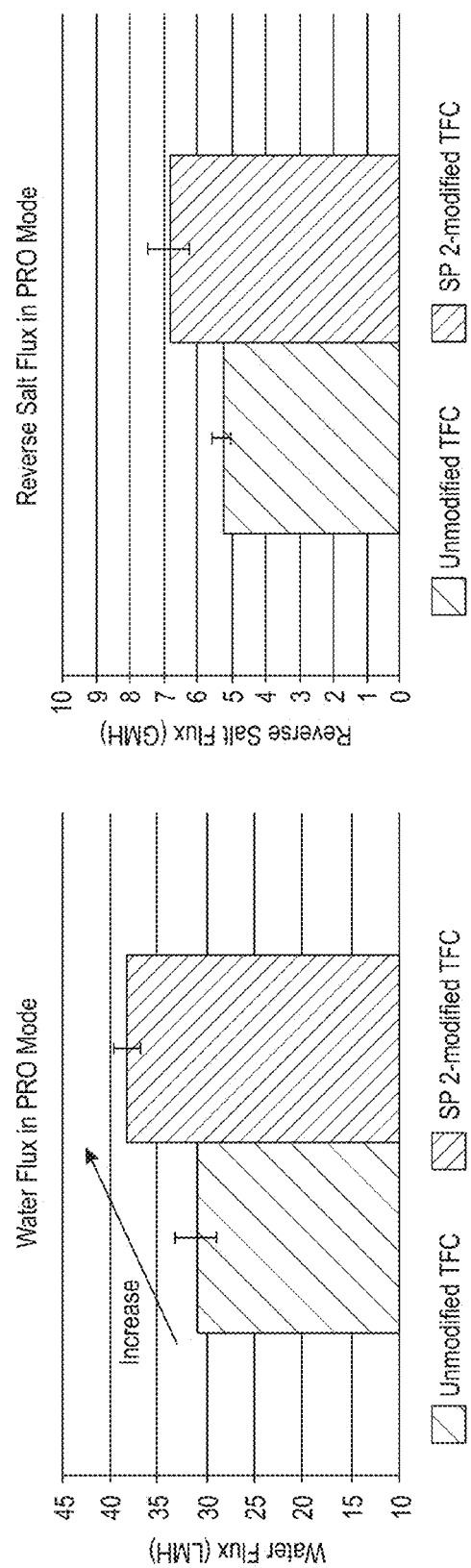
FIG. 6 includes plots of water flux and reverse salt flux with a 1 M NaCl draw solution and deionized (DI) water feed of unmodified and SP 2-modified TFC FO membranes of Example 2 evaluated in PRO mode (active layer facing the draw solution).

Using the procedure set forth in Example 1 above, the pores of an HTI TFC FO membrane were modified with SP 2. The SP 2-modified TFC FO membrane also showed enhanced FO performance in both FO and PRO mode as shown in FIGS. 5-6.

Example 3

Modification of Porous Support of TFC FO Membrane with Star Polymer SP 3

The SP 3 star polymer contained hydrophilic arms with 35 mol % of a carboxylate moiety (COOH) and 65 mol % of a polyethylene glycol moiety (x=0.35 in the Formula 3(b)).

Figure 7:
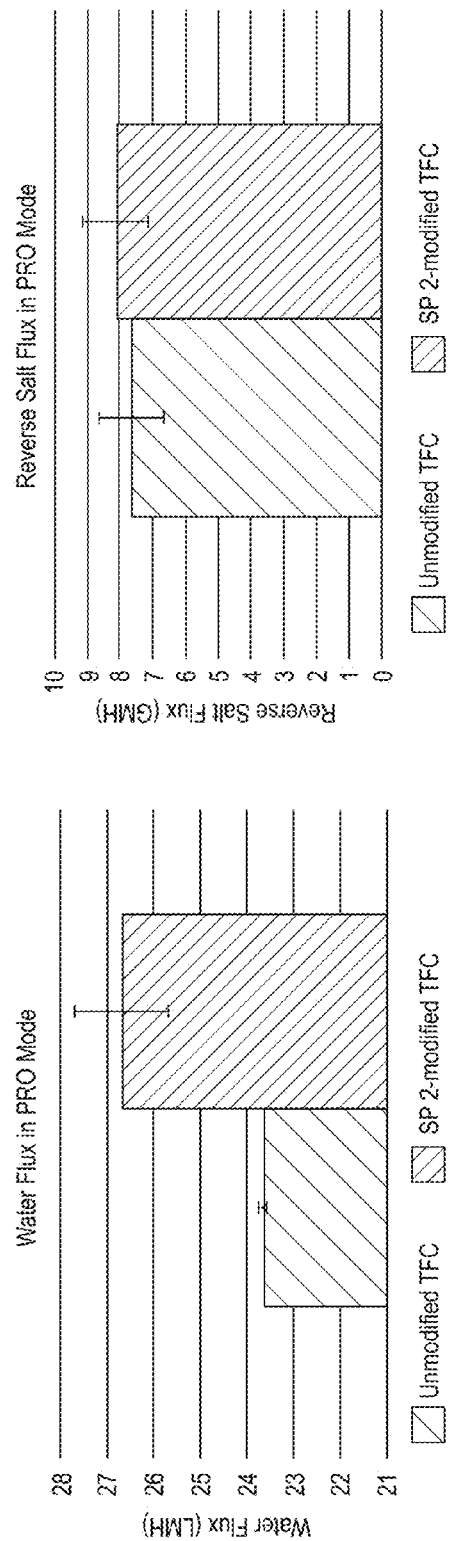
FIG. 7 includes plots of water flux and reverse salt flux with a 1 M NaCl draw solution and deionized (DI) water feed of unmodified and SP 3-modified TFC FO membranes of Example 3 evaluated in PRO mode (active layer facing the draw solution).

Using the procedure set forth in Example 1 above, the pores of an HTI TFC FO membrane were modified with SP 3. The SP 3-modified TFC FO membrane showed enhanced FO performance in PRO mode (FIG. 7).

Various embodiments of the invention have been described. These and other embodiments are within the scope of the following claims.

The invention claimed is:

1. A thin film composite (TFC) forward osmosis (FO) membrane, comprising:
   a porous support comprising a plurality of pores extending from one face to an opposite face thereof, wherein the pores in the support comprise surfaces having thereon a hydrophilic self-assembled monolayer, wherein the self-assembled monolayer comprises hydrophilic-functionalized star polymers, the star polymers comprising a central core and at least 6 polymeric arms covalently attached to the central core; and
   an active layer on the support, wherein the active layer comprises a material capable of removing an ionic species from a liquid.

2. The TFC membrane of claim 1, wherein the star polymers comprise hydrophilic arms.

3. The TFC membrane of claim 1, wherein the hydrophilic-functionalized star polymers are crosslinked.

4. The TFC membrane of claim 1, wherein the active layer comprises a cross-linked aromatic polyamide film.

5. The TFC membrane of claim 1, wherein the porous support comprises a polysulfone.

6. The TFC membrane of claim 2, wherein the hydrophilic arms of the star polymers comprise positively charged moieties, neutral hydrophilic moieties, negatively charged moieties, zwitterionic moieties, or combinations thereof.

7. The TFC membrane of claim 6, wherein the positively charged moiety is selected from ammonium ions and their neutral precursors.

8. The TFC membrane of claim 6, wherein the negatively charged moiety is selected from carboxylates, phosphates sulfonates, sulfinates, sulfonamides, and imides.

9. The TFC membrane of claim 6, wherein the neutral hydrophilic moiety is selected from the group consisting of zwitterions, hydroxylalkylesters, hydroxylakylamide, polyethlyene oxide (PEO), and combination of thereof.

10. A thin film composite (TFC) membrane, comprising:
    a porous support comprising a plurality of pores extending from one face to an opposite face thereof, wherein at least some of the pores in the support comprise surfaces having thereon a hydrophilic layer comprising functionalized star polymers, the star polymers comprising a central core and at least 6 polymeric arms covalently attached to the central core; and
    an active layer on the support, wherein the active layer comprises a layer of a polyamide, a plurality of layers of a star polymer, and combinations thereof.

11. The TFC membrane of claim 10, wherein the star polymer in the hydrophilic layer comprises a nanogel core and at least one amino-functional arm attached to the nanogel core.

12. The TFC membrane of claim 10, wherein the hydrophilic layer comprises the star polymer of the formula below:

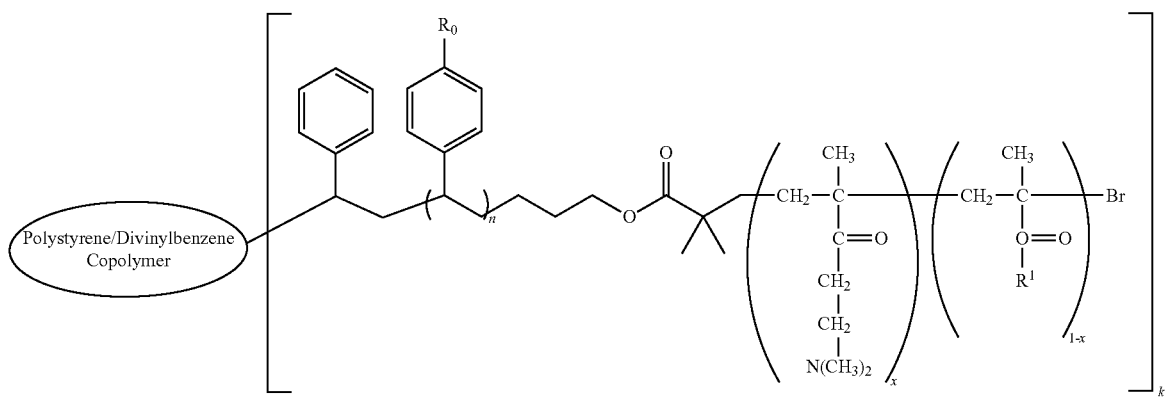

wherein, $R_0$ is a homopolymer or random copolymer with monomeric units selected from the group consisting of alkyl, cycloalkyl, alkoxy and combinations thereof; $R^1$ is selected from the group consisting of $OCH_2CH_2OH$ and $O\text{-}(PEG)\text{-}OCH_3$, with PEG representing poly(ethylene glycol); $0 \leq x \leq 1$; k is greater than or equal to about 6; and n is greater than about 10.

13. The TFC membrane of claim 10, wherein the hydrophilic layer comprises a star polymer with a nanogel core to which at least one carboxyl-functional arm is attached.

14. The TFC membrane of claim 10, wherein the hydrophilic layer comprises the star polymer of the formula below:

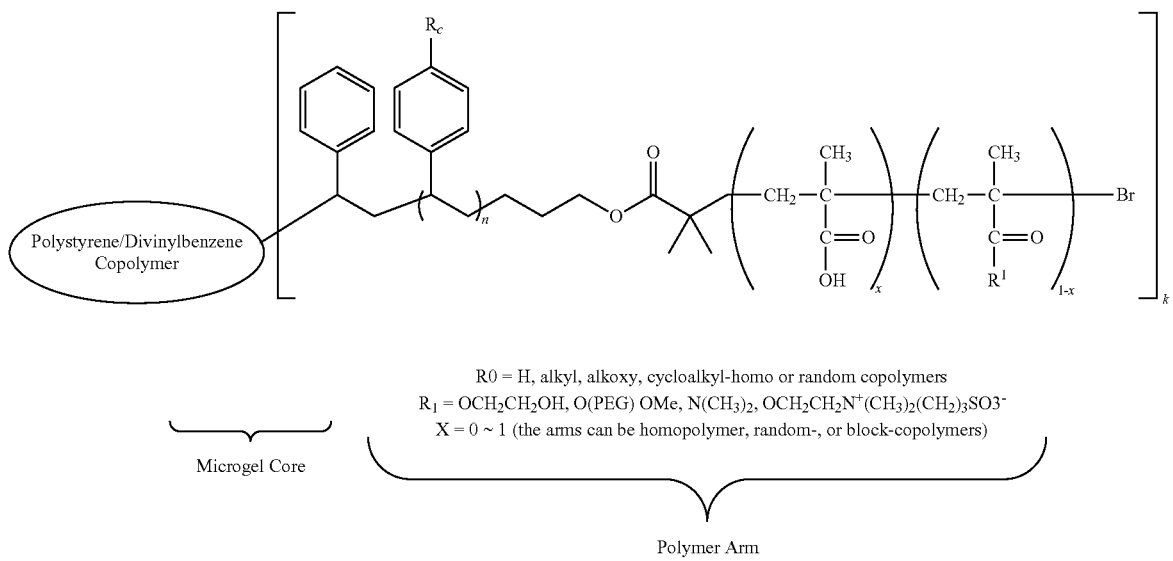

wherein, R0 is a homopolymer or a random copolymer with monomeric units selected from the group consisting of H, alkyl, cycloalkyl, alkoxy, and combinations thereof; k is greater than or equal to about 6, R1 is selected from the group consisting of COOH, $OCH_2CH_2OH$, O-(PEG), wherein PEG represents poly(ethylene glycol), $OCH_3$, $N(CH_3)_2$, $OCH_2CH_2N^+(CH_3)_2(CH_2)_3SO_3^-$, and combinations thereof; $0 \leq x \leq 1$, and n is greater than about 10.

15. The membrane of claim 1, wherein the monolayer comprises the star polymer of the formula below:

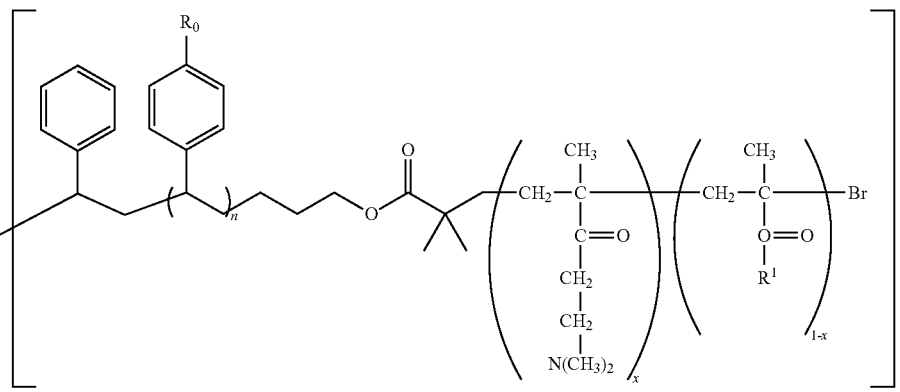
wherein, $R_0$ is a homopolymer or random copolymer with monomeric units selected from the group consisting of alkyl, cycloalkyl, alkoxy and combinations thereof; $R^1$ is selected from the group consisting of $OCH_2CH_2OH$ and $O$-(PEG)-$OCH_3$, with PEG representing poly(ethylene glycol); $0 \leq x \leq 1$; k is greater than or equal to about 6; and n is greater than about 10.
* * * * *